United States Patent
Takahashi et al.

(10) Patent No.: US 6,604,061 B2
(45) Date of Patent: Aug. 5, 2003

(54) INSTRUMENTS MANAGEMENT SYSTEM AND METHOD AND MONITORING APPARATUS, DATABASE APPARATUS AND DATA BASE CLIENT APPARATUSES AND RECORDING MEDIUM

(75) Inventors: Ichiro Takahashi, Inzai (JP); Seigo Kurokawa, Narashino (JP); Tatsuhiko Asano, Ichikawa (JP); Hiromitsu Kaneko, Funabashi (JP)

(73) Assignees: Hitachi, Ltd., Tokyo (JP); Hitachi Keiyo Engineering Co., Ltd., Narashino (JP)

(*) Notice: Subject to any disclaimer, the term of this patent is extended or adjusted under 35 U.S.C. 154(b) by 0 days.

(21) Appl. No.: 10/084,207

(22) Filed: Feb. 28, 2002

(65) Prior Publication Data

US 2002/0082810 A1 Jun. 27, 2002

Related U.S. Application Data

(63) Continuation of application No. 09/810,581, filed on Mar. 19, 2001.

(30) Foreign Application Priority Data

Jul. 13, 2000 (JP) ........................................ 2000-212374

(51) Int. Cl.$^7$ .............................................. G06F 19/00
(52) U.S. Cl. ........................................ 702/188; 702/184
(58) Field of Search .............................. 702/33–36, 56, 702/182–185, 188

(56) References Cited

U.S. PATENT DOCUMENTS 5,287,875 A * 2/1994 Otani ..................... 137/15.01
5,533,413 A * 7/1996 Kobayashi et al. ........ 73/865.9
5,963,884 A * 10/1999 Billington et al. ............. 702/56
6,006,171 A * 12/1999 Vines et al. .................... 700/83
6,192,325 B1 * 2/2001 Piety et al. ................... 702/183
6,195,621 B1 * 2/2001 Bottomfield ................. 702/183
6,260,004 B1 * 7/2001 Hays et al. ................... 702/130
6,295,510 B1 * 9/2001 Discenzo ..................... 310/50
6,298,308 B1 * 10/2001 Reid et al. ................... 702/188
6,330,525 B1 * 12/2001 Hays et al. ................... 376/245
6,343,251 B1 * 1/2002 Herron et al. ................ 701/100
6,370,957 B1 * 4/2002 Filippenko et al. ........... 73/593
2001/0001851 A1 * 5/2001 Piety et al.
2001/0008993 A1 * 7/2001 Bottomfield ................. 702/56
2002/0022969 A1 * 2/2002 Berg et al. ...................... 705/1

FOREIGN PATENT DOCUMENTS

| JP | 423189 | 1/1992 |
| JP | 4340325 | 11/1992 |
| JP | 10190592 | 7/1998 |
| JP | 11239390 | 8/1999 |

* cited by examiner

Primary Examiner—Patrick Assouad
(74) Attorney, Agent, or Firm—Antonelli,Terry,Stout & Kraus, LLP

(57) ABSTRACT

An equipment management system structured by a monitoring apparatus to monitor equipment of a facility being monitored and retrieve operation data, a database apparatus in which the operation data retrieved by the monitoring apparatus is recorded, and a database client apparatus to send and receive information to and from the database apparatus via a network, display the data recorded in the database apparatus, and enter data. The database apparatus records maintenance reference values for the equipment of the facility being monitored and the monitoring apparatus or database client apparatus outputs a display or printout prompting an execution of maintenance work when the operation data is in excess of or close to the maintenance reference values.

4 Claims, 2 Drawing Sheets

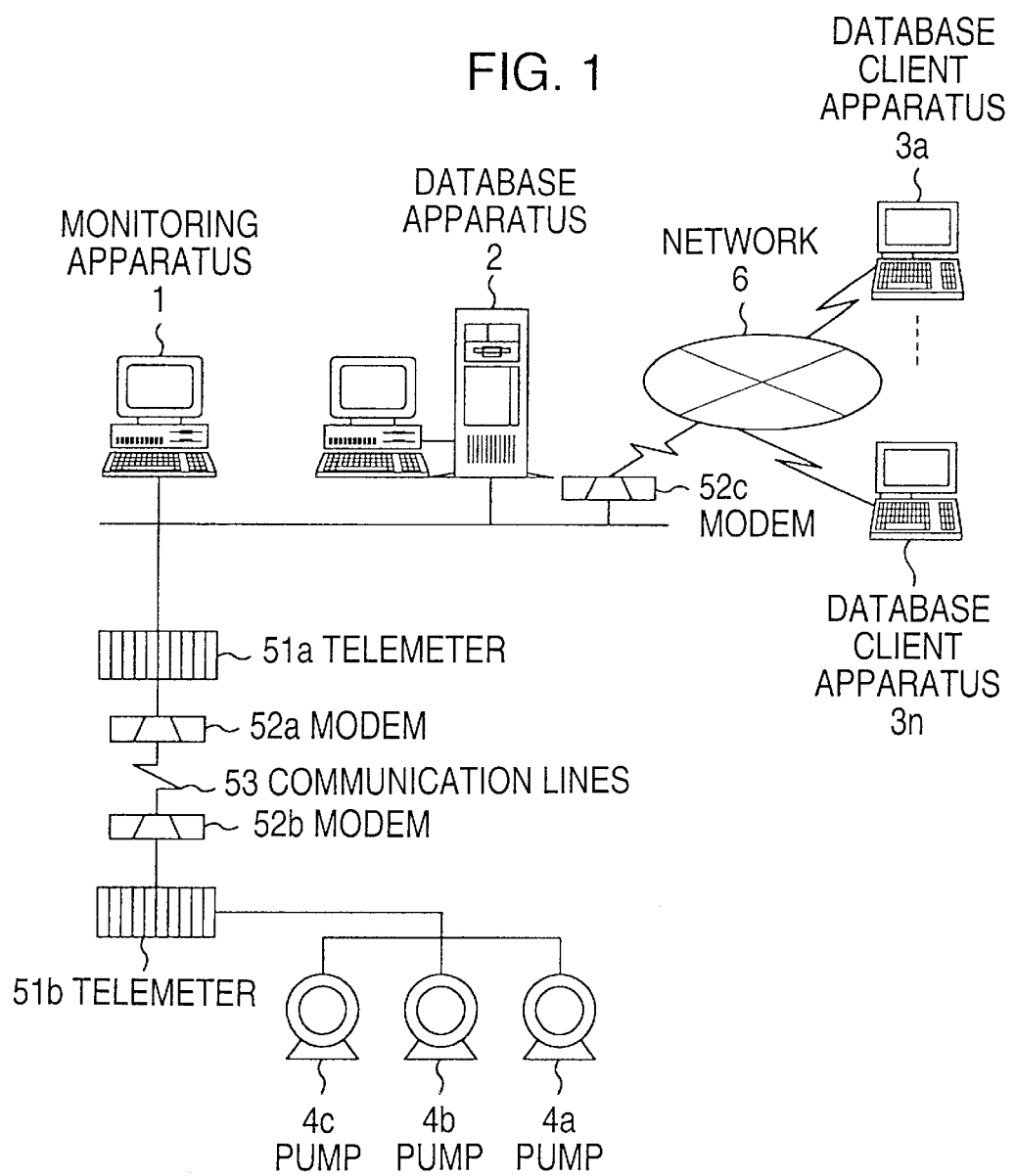

FIG. 2

| NO. | EQUIPMENT NAME | CONSUMABLE PARTS | MAINTENANCE PERIOD | OPERATION START DATE |
|---|---|---|---|---|
| 1 | PUMP 1 | POWER SUPPLY | 5 YEARS | JAN. 10, 2000 |
|   |   | SWITCH | 10 YEARS | JAN. 10, 2000 |
|   |   | BEARING | 15 YEARS | JAN. 10, 2000 |
| 2 | PUMP 2 | POWER SUPPLY | 5 YEARS | DEC. 10, 1999 |
|   |   | SWITCH | 10 YEARS | DEC. 10, 1999 |
|   |   | BEARING | 15 YEARS | DEC. 10, 1999 |
| 3 | PUMP 3 | POWER SUPPLY | 5 YEARS | JULY 15, 1998 |
|   |   | SWITCH | 10 YEARS | JULY 15, 1998 |
|   |   | BEARING | 15 YEARS | JULY 15, 1999 |

FIG. 3

| NO. | EQUIPMENT NAME | QUANTITY TO BE MANAGED | CALCULATION | REFERENCE VALUE |
|---|---|---|---|---|
| 1 | PUMP 1 | CURRENT VALUE | — | MAX. 60A |
|   |   | NO. OF OPERATIONS | — | TOTAL 100,000 |
|   |   | EFFICIENCY | FLOW ÷ CURRENT VALUE | MIN. $1.5 m^3/h/A$ |
| 2 | PUMP 2 | CURRENT VALUE | — | MAX. 80A |
|   |   | NO. OF OPERATIONS | — | TOTAL 100,000 |
|   |   | EFFICIENCY | FLOW ÷ CURRENT VALUE | MIN. $2 m^3/h/A$ |
| 3 | PUMP 3 | CURRENT VALUE | — | MAX. 100A |
|   |   | NO. OF OPERATIONS | — | TOTAL 100,000 |
|   |   | EFFICIENCY | FLOW ÷ CURRENT VALUE | MIN. $3 m^3/h/A$ |

INSTRUMENTS MANAGEMENT SYSTEM AND METHOD AND MONITORING APPARATUS, DATABASE APPARATUS AND DATA BASE CLIENT APPARATUSES AND RECORDING MEDIUM

The present application is a continuation of application Ser. No. 09/810,581, filed Mar. 19, 2001 the contents of which are incorporated herein by reference.

BACKGROUND OF THE INVENTION

The present invention relates to an equipment management system and method, a monitoring apparatus, a database apparatus, a database client apparatus, and a recording medium. More specifically, the present invention relates to an equipment management system which monitors and records the operations of service water and sewage water supply/distribution facilities, industrial production facilities and sales data collecting facilities and which displays and records failures and abnormal conditions of these facilities and displays when it is necessary to maintain the facilities being monitored.

Conventional monitoring apparatus have only functions of displaying the operational conditions of equipment being monitored and recording operation data. Hence, although among the operation data there are useful data for the maintenance of equipment, it is difficult to take advantage of these data for the maintenance purpose.

Let us take the maintenance of a water supply pump as an example. If the operation time after the pump has been started exceeds a maintenance period, it may be decided that consumable parts need to be replaced. Although the pump operation time is among the data contained in the monitoring apparatus, maintenance period data (indicating, for example, that the pump needs overhauling every five years) is not entered in the monitoring apparatus. Hence, it is difficult to use the operation time in determining the maintenance timing.

After the maintenance has been executed, the pump is restarted and its operation time is counted for the next maintenance period with the maintenance execution date taken as a reference. The conventional monitoring apparatus, however, have no means to enter the maintenance execution date.

It has therefore been proposed that maintenance is managed by entering reference values such as a maintenance and inspection execution date (Japanese Unexamined Patent Publication Nos. 4-340325, 11-239390, 10-190592 and 4-23189). These proposed techniques, however, do not consider accessing various data in a database apparatus from a plurality of devices.

SUMMARY OF THE INVENTION

The present invention is intended to solve the conventional problems and provide an equipment management system which allows the monitor data accumulated in the monitoring apparatus to be used by a plurality of apparatus; which has a function of adding maintenance reference values as data, checking whether the maintenance is necessary and displaying when the maintenance is necessary; and which has a means for entering the date that the maintenance work was executed. The invention also provides an equipment management method, a monitoring apparatus, a database apparatus, a database client apparatus, and a recording medium.

According to one aspect, the invention provides an equipment management system comprising: a monitoring apparatus to monitor equipment of a facility being monitored and retrieve operation data; a database apparatus in which the operation data retrieved by the monitoring apparatus is recorded; and a database client apparatus to send and receive information to and from the database apparatus via a network, display the data recorded in the database apparatus, and enter data; wherein the database apparatus records maintenance reference values for the equipment of the facility being monitored and the monitoring apparatus or database client apparatus outputs a display or printout prompting an execution of maintenance work when the operation data is in excess of or close to the maintenance reference values.

According to another aspect, the invention provides an equipment management system, wherein, after the equipment of the facility being monitored is serviced, an equipment operation start date is entered from the database client apparatus, a check is made based on the equipment operation start date as to whether a maintenance period is exceeded or will soon be exceeded, and a display or printout prompting an execution of maintenance work is output to the monitoring apparatus or database client apparatus.

According to still another aspect, the invention provides a monitoring apparatus for monitoring equipment of a facility being monitored and retrieving operation data, the monitoring apparatus forming an equipment management system along with: a database apparatus in which the operation data retrieved by the monitoring apparatus is recorded; and a database client apparatus to send and receive information to and from the database apparatus via a network, display the data recorded in the database apparatus, and enter data; wherein when the retrieved operation data is in excess of or close to maintenance reference values for the equipment of the facility being monitored which are recorded in the database apparatus, the monitoring apparatus outputs a display or printout prompting an execution of maintenance work.

According to a further aspect, the invention provides a database apparatus in which operation data retrieved by a monitoring apparatus is recorded, the database apparatus forming an equipment management system along with: a monitoring apparatus to monitor equipment of a facility being monitored and retrieve the operation data; and a database client apparatus to send and receive information to and from the database apparatus via a network, display the data recorded in the database apparatus, and enter data; wherein the database apparatus records maintenance reference values for the equipment of the facility being monitored.

According to a further aspect, the invention provides a database client apparatus for sending and receiving information to and from a database apparatus via a network, displaying the data recorded in the database apparatus, and entering data, the database client apparatus forming an equipment management system along with: a monitoring apparatus to monitor equipment of a facility being monitored and retrieve operation data; and a database apparatus in which the operation data retrieved by the monitoring apparatus is recorded; wherein when the retrieved operation data is in excess of or close to maintenance reference values for the equipment of the facility being monitored which are recorded in the database apparatus, the database client apparatus outputs a display or printout prompting an execution of maintenance work.

According to a further aspect, the invention provides a recording medium used in an equipment management system, the equipment management system comprising: a monitoring apparatus to monitor equipment of a facility being monitored and retrieve operation data; a database apparatus in which the operation data retrieved by the monitoring apparatus is recorded; and a database client apparatus to send and receive information to and from the database apparatus via a network, display the data recorded in the database apparatus, and enter data; wherein the recording medium records a program which realizes in a computer a function of recording maintenance reference values for the equipment of the facility being monitored or a function of outputting a display or printout prompting an execution of maintenance work when the operation data is in excess of or close to the maintenance reference values.

According to a further aspect, the invention provides an equipment management method comprising the steps of: monitoring equipment of a facility being monitored; receiving operation data from the equipment via a network; comparing the operation data with maintenance reference values for the equipment of the facility being monitored, the maintenance reference values being recorded in the database apparatus or database client apparatus; and outputting a display or printout prompting an execution of maintenance work when the operation data is in excess of or close to the maintenance reference values.

BRIEF DESCRIPTION OF THE DRAWINGS

FIG. 1 is an explanatory diagram showing a configuration of an equipment management system as one embodiment of the invention.

FIG. 2 is a table showing an example data structure for each equipment including a maintenance period and an operation start date.

FIG. 3 is a table showing an example data structure for each equipment including quantities to be managed.

DESCRIPTIONS OF THE EMBODIMENTS

An embodiment of the present invention will be described.

An equipment management system and method, a monitoring apparatus, a database apparatus, a database client apparatus and a recording medium in the embodiment of this invention will be explained by referring to FIGS. 1 to 3. FIG. 1 is an explanatory diagram showing a configuration of the equipment management system as one embodiment. FIG. 2 is a table showing an example data structure for each equipment including a maintenance period and an operation start date. FIG. 3 is a table showing an example data structure for each equipment including quantities to be managed.

The equipment management system in this embodiment includes, as shown in FIG. 1, a monitoring apparatus 1, a database apparatus 2 and database client apparatus 3a–3n (arbitrary number of apparatus), and is connected to equipment 4a, 4b, 4c in the facility being monitored and also connected to a network 6. The monitoring apparatus 1 retrieves and records operation data of the equipment (pumps 4a, 4b, 4c) being monitored at a remote location through telemeters 51a, 51b, modems 52a, 52b and communication lines 53. The operation data recorded for the pump 4a includes a daily operation time, a number of times the pump was operated (number of times the operation switch was turned on), a current value supplied to the pump, and a water flow delivered by the pump. The similar operation data is also recorded for the pumps 4b and 4c.

These operation data are recorded in the database apparatus 2. The monitoring apparatus 1 is connected to the database apparatus 2 and continuously writes instantaneous data into the database apparatus 2. The operation data is recorded in the database apparatus 2.

In addition to the operation data, the database apparatus 2 stores reference values entered in advance from the database client apparatus 3a–3n. The reference values include a period for maintaining a power source of the pump 4a, a period for maintaining an operation switch of the pump 4a, and a period for maintaining bearings. Among other reference values are a maximum current value for driving the pump 4a, an accumulated number of operations before the maintenance, and an efficiency of water flow delivered by the pump. An example of data such as maintenance period is shown in FIG. 2 and an example of data such as reference value in FIG. 3.

The database client apparatus 3a–3n are connected via the network 6 to the database apparatus 2. When a check is made as to whether there is any equipment being monitored that needs to be serviced, a program installed in the database client apparatus 3a–3n is started to search for operation data in the database apparatus 2 which has exceeded the reference value or will exceed it within one month for example. In more concrete terms, a search is made for a pump that, for instance, has exceeded or will exceed within one month the maintenance period for the pump power supply. If the operation data that has exceeded or will exceed within one month the reference value exists in the database apparatus 2, the program displays which equipment has exceeded or will exceed within one month which reference value on the database client apparatus 3a–3n.

The reference values are data in the database apparatus 2 and thus can be modified to values obtained from experience of equipment operations. Suppose, for example, the maintenance period for the pump power supply was designed to be five years and that the operational experience suggests that the maintenance be performed at 7-year intervals. Then, the reference value can be changed to 7 years by operating the database client apparatus 3a–3n.

When the maintenance work is finished, the date that the maintenance was performed is written into the database apparatus 2. The next maintenance service is determined based on the time that elapses from the maintenance execution date. For example, the next maintenance timing will come five years after the date that the pump power supply was replaced. The maintenance execution date is entered into the database from the database client apparatus 3a–3n, which use the entered date to check whether the maintenance period arrives.

The database apparatus 2 has a function that allows a plurality of database client apparatus 3a–3n to access data in the database apparatus 2 via the network 6 and modem 52c. In the conventional systems that do not use the database apparatus 2, the monitoring apparatus 1 and apparatus storing the data need to be operated directly.

With both a facility manager (owner of the facility) and a maintenance service contractor keeping the database client apparatus 3a–3n, the maintenance execution date can be entered into the database apparatus 2 by the maintenance service contractor. This allows the maintenance service contractor to expand its business.

The maintenance service includes the following.

(1) The database client apparatus 3a–3n check whether the facility has reached the time for performing the maintenance work. (2) In the event of an anomaly in the facility, a possible cause of trouble and a measure to be taken are diagnosed. (3) A necessary maintenance service is performed. (4) After the maintenance work is finished, necessary data is set in the database. (5) Renewal of facility is proposed based on the maintenance data.

With this embodiment, reference values required for determining whether a maintenance work is necessary or not are added to the operation data in the conventional monitoring apparatus and a decision is made as to whether the values obtained from the operation data or from calculations based on the operation data are in excess of or close to the reference values. Thus it is possible to display when the maintenance work is necessary on the equipment management system. Further, the maintenance data can be referenced or entered from outside via communications network and thus jointly operated by an organization responsible for managing the equipment management system and an organization responsible for operating the system.

In the above embodiment, the equipment management system and method, the monitoring apparatus, the database apparatus and the database client apparatus have been described. A program may be stored in a computer-readable recording medium (e.g., CD-ROM) to realize in a computer a function for recording equipment maintenance reference values or a function for outputting a display or printout prompting the execution of the maintenance service when the operation data is in excess of or close to the maintenance reference value. By using this recording medium, microcomputers can be made to work as monitoring apparatus, database apparatus and database client apparatus.

With the embodiment of this invention, the equipment management system can be obtained which allows the monitor data accumulated in the monitoring apparatus to be used by a plurality of apparatus; which has a function of adding maintenance reference values as data, checking whether the maintenance is necessary and displaying when the maintenance is necessary; and which has a means for entering the date that the maintenance work was executed.

What is claimed is:

1. An equipment management method comprising the steps of:

monitoring equipment of a facility including at least one pump being monitored;

receiving operation data from said equipment via a network;

comparing said operation data with maintenance reference values for said equipment of said facility including at least one pump being monitored, wherein said maintenance reference values being recorded in at least one database apparatus being operated by a facility manager or at least one database client apparatus being operated by a maintenance service contractor, and wherein said maintenance service contractor is located at a location other than a location of said facility manager; and outputting a display or printout prompting an execution of maintenance work by said maintenance service contractor when said operation data is in excess of or close to said maintenance reference values.

2. An equipment management method according claim 1, wherein said operation data is at least one of a daily operation time, a number of times said at least one pump was operated, a current value supplied to said at least one pump, and a water flow delivered by said at least one pump, wherein said maintenance reference values are at least one of a period for maintaining a power source of said at least one pump, a period for maintaining an operation switch of said at least one pump, a period for maintaining bearings, a maximum operation before maintenance, and an efficiency of water flow delivered by said at least one pump, and wherein maintenance information is displayed or printed according to a comparison between said operation data and said maintenance reference values.

3. An equipment management method according to claim 2, wherein said maintenance reference values can be changed by said at least one database apparatus or said at least one database client apparatus being operated by a maintenance service contractor, and wherein maintenance information is displayed or printed according to a comparison between changed maintenance reference values and said operation data.

4. An equipment management method according to claim 2, wherein said maintenance reference values is rewritten by said at least one database client apparatus when maintenance operation is completed, and next maintenance information is displayed or printed according to a comparison between rewritten maintenance reference values and said operation data.

* * * * *